United States Patent
Adam et al.

(10) Patent No.: US 9,970,483 B2
(45) Date of Patent: May 15, 2018

(54) SELF-LUBRICATING THERMOPLASTIC LAYERS CONTAINING PTFE ADDITIVE HAVING A POLYMODAL MOLECULAR WEIGHT

(71) Applicant: FEDERAL-MOGUL WIESBADEN GMBH, Wiesbaden (DE)

(72) Inventors: Achim Adam, Nauheim (DE); Norbert Fleischhacker, Lorsch (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 61 days.

(21) Appl. No.: 15/107,972

(22) PCT Filed: Dec. 22, 2014

(86) PCT No.: PCT/EP2014/079010
§ 371 (c)(1),
(2) Date: Jun. 24, 2016

(87) PCT Pub. No.: WO2015/097160
PCT Pub. Date: Jul. 2, 2015

(65) Prior Publication Data
US 2016/0327089 A1     Nov. 10, 2016

(30) Foreign Application Priority Data
Dec. 27, 2013 (DE) .................. 10 2013 227 188

(51) Int. Cl.
*F16C 33/20* (2006.01)
*F16C 33/12* (2006.01)
*B32B 27/32* (2006.01)

(52) U.S. Cl.
CPC .......... *F16C 33/201* (2013.01); *B32B 27/322* (2013.01); *F16C 33/128* (2013.01);
(Continued)

(58) Field of Classification Search
CPC .. F16C 33/201; F16C 33/128; F16C 2208/21; F16C 2208/22; F16C 2208/32;
(Continued)

(56) References Cited

U.S. PATENT DOCUMENTS 4,394,275 A * 7/1983 Bickle ................. C22C 32/0094
508/104
5,024,882 A * 6/1991 Matucha ................. C08K 3/08
428/323
(Continued)

FOREIGN PATENT DOCUMENTS

DE         4227909 A1 * 2/1994 ............. C08L 27/18
DE         19808540 B4    5/2004
(Continued)

OTHER PUBLICATIONS

International Search Report, dated Apr. 10, 2015 (PCT/EP2014/079010).

*Primary Examiner* — Marcus Charles
(74) *Attorney, Agent, or Firm* — Robert L. Stearns; Dickinson Wright, PLLC

(57) ABSTRACT

A sliding material for gliding elements includes a thermoplastic matrix material and a PTFE additive. The PTFE additive includes at least two different types of PTFE having different molecular weights.

18 Claims, 3 Drawing Sheets

Figure 1:
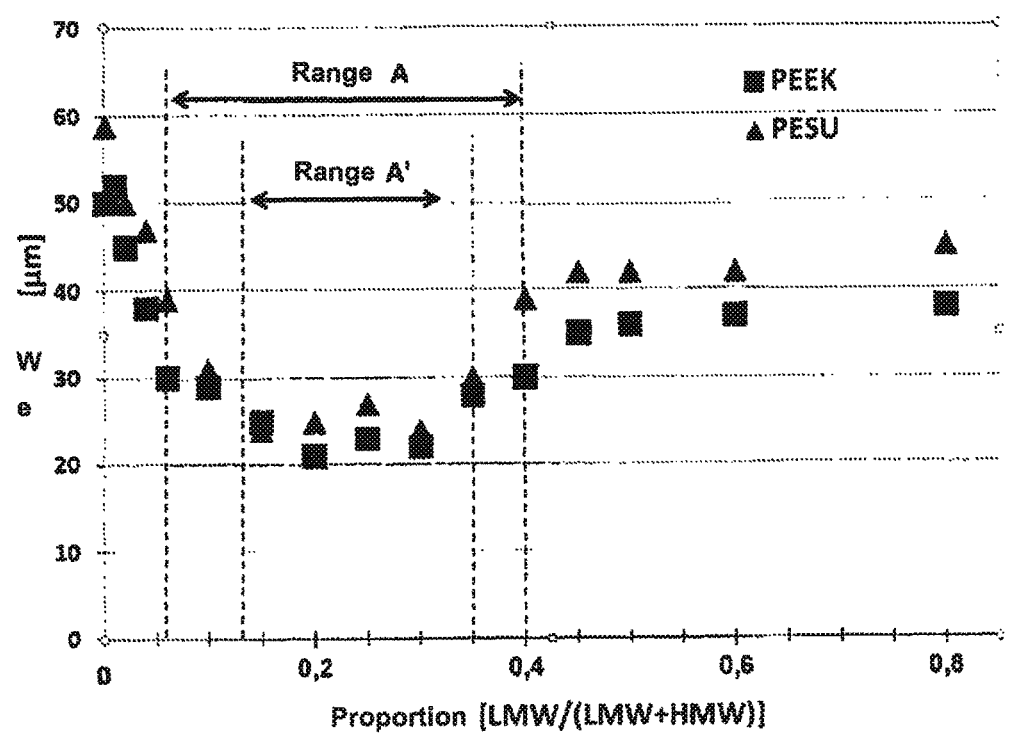

(52) U.S. Cl.
CPC ..... *C08L 2205/02* (2013.01); *C08L 2205/025* (2013.01); *C08L 2205/03* (2013.01); *C08L 2205/035* (2013.01); *F16C 2208/32* (2013.01)

(58) Field of Classification Search
CPC ........... C08L 2205/03; C08L 2205/025; C08L 2205/035; B32B 15/04; B32B 27/322
USPC ....... 384/129, 276, 279, 300, 297, 902, 908; 428/550
See application file for complete search history.

(56) References Cited

U.S. PATENT DOCUMENTS

| | | | | |
|---|---|---|---|---|
| 5,158,680 | A * | 10/1992 | Kawai | B01D 63/022 210/321.61 |
| 5,159,019 | A * | 10/1992 | Yamamoto | C08L 81/02 525/189 |
| 5,643,683 | A * | 7/1997 | Tanaka | C09D 171/00 428/539.5 |
| 6,042,778 | A * | 3/2000 | Kraft | F16C 33/201 419/2 |
| 6,057,393 | A | 5/2000 | Hirai | |
| 6,376,062 | B1 | 4/2002 | Adam | |
| 7,249,890 | B2 * | 7/2007 | Bickle | B32B 15/04 384/276 |
| 8,267,589 | B2 * | 9/2012 | Tsuji | F16C 17/02 384/276 |
| 8,646,977 | B2 * | 2/2014 | Adam | B32B 15/08 384/129 |
| 2001/0016625 | A1 | 8/2001 | Lahijani | |
| 2002/0037992 | A1 * | 3/2002 | Niwa | C08L 27/18 528/189 |
| 2007/0269674 | A1 * | 11/2007 | Yanase | C08L 27/18 428/550 |
| 2008/0193324 | A1 * | 8/2008 | Sato | B22F 7/08 420/470 |
| 2008/0226933 | A1 * | 9/2008 | Bickle | F16C 33/201 428/545 |
| 2012/0008887 | A1 | 1/2012 | Adam | |
| 2013/0260097 | A1 * | 10/2013 | Takada | B32B 5/16 428/143 |

FOREIGN PATENT DOCUMENTS

| | | | |
|---|---|---|---|
| DE | 10226264 B4 | 1/2006 | |
| DE | 102008055195 B4 | 2/2013 | |
| EP | 45360 A * | 2/1982 | ................ B41J 1/20 |
| EP | 0892017 A2 | 1/1999 | |
| JP | 2001040225 A | 2/2001 | |
| WO | WO-8101375 A1 * | 5/1981 | ............... B05D 5/08 |
| WO | 2010076307 A1 | 7/2010 | |
| WO | 2011075351 A1 | 6/2011 | |

* cited by examiner

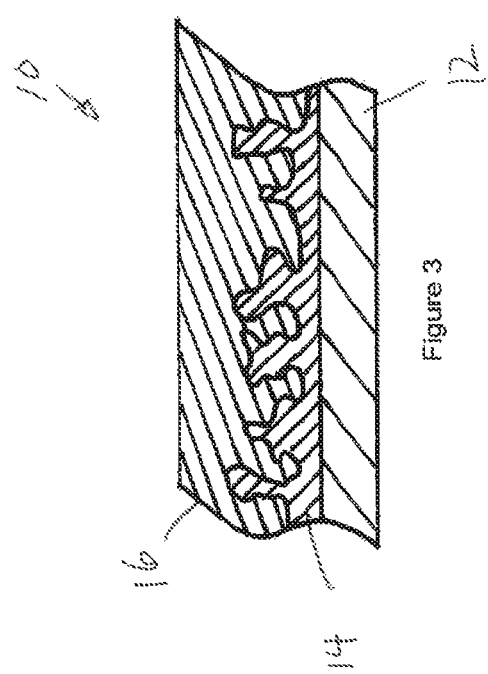

ively realized as a steel backing. This porous and mostly
SELF-LUBRICATING THERMOPLASTIC LAYERS CONTAINING PTFE ADDITIVE HAVING A POLYMODAL MOLECULAR WEIGHT This U.S. Utility patent application Ser. No. 15/107,972, filed Jun. 24, 2016, claims priority to International Patent Application Serial No. PCT/EP2014/079010, filed Dec. 22, 2014, which claims priority to German Patent Application No. 10 2013 227 188.3, filed Dec. 27, 2013, each of which are incorporated herein by reference.

BACKGROUND OF THE INVENTION

1. Technical Field

The present invention relates to a sliding material for sliding elements, wherein the sliding material comprises a thermoplastic matrix material and a PTFE (polytetrafluoroethylene) additive. In addition, the invention relates to a sliding element and a plain bearing.

2. Related Art

Maintenance-free sliding elements, such as plain bearings, are often made of multilayer materials. A porous sintered layer is applied to a support medium, which is usually realized as a steel backing. This porous and mostly metallic component is in turn impregnated with a lubricating material, and also covered by the same. Two different types are recognized, depending on the nature of the matrix polymer of the sliding material: sliding materials based on PTFE, and sliding materials based on plastics which can be treated thermoplastically (abbreviated thermoplastics), wherein the latter are of relevance here.

The sliding layers, consisting of thermoplastic sliding materials, are either provided with recesses to hold an amount of lubricant with long-term efficacy, or they are used in the form of a compound which is modified with lubricants.

It has been found that some of these types of material, with theft plastic sliding surfaces, are advantageous over purely metallic bearing materials in media-lubricated applications, such as pumps or hydraulic shock absorbers, because of their good shape matching and dirt holding capacity, as well as theft high wear resistance. In this case, the PTFE-based materials are characterized by a particularly low friction coefficient when lubricated by the media, whereas thermoplastic materials can be very resistant to wear. Suitable modified thermoplastic layers can significantly exceed the wear and load resistance of PTFE based coatings, but have a significantly higher coefficient of friction with lubrication media despite their modification.

As such, thermoplastic bearing materials have been used for many years in highly wear-intensive media-lubricated applications. DE 102 26 264 B4 describes, for example, a modified PEEK material specially developed for high temperatures, having high wear resistance. However, it is not possible when this material is used to reach the low coefficient of friction of PTFE-based materials with media lubrication.

From DE 198 08 540 B4, materials based on thermoplastics are known which have more favorable friction values than conventional thermoplastic bearing materials, because of a relatively high PTFE content and due to the avoidance of hard additives, but which are still significantly higher than those of the materials based on PTFE.

However, there is a limit to how much PTFE can be incorporated, because too high a proportion weakens the thermoplastic matrix, which in turn has a negative effect on the wear resistance of the material.

To solve this problem, DE 10 2008 055 195 B4 suggests producing a PTFE gradient by impregnating the material with a PTFE dispersion, such that it is possible to significantly reduce the coefficient of friction, especially in the outer region of the sliding layer. However, this reduces the wear resistance. A further disadvantage of this approach is the combined method in which first powder, then a liquid must be applied to a strip material, which requires increased outlay for machinery.

SUMMARY OF THE INVENTION

The problem addressed is therefore that of improving the coefficient of friction of the thermoplastic materials with media lubrication, without affecting the wear resistance in the absence of lubrication.

The sliding material for sliding elements has a thermoplastic matrix material and a PTFE additive. This PTFE-additive in turn comprises at least two different types of PTFE of different molecular weights.

By adding PTFE with at least two different molecular weights, it is possible to optimize both the friction coefficient and the wear resistance of thermoplastic-based sliding materials, and therefore at the same time to match the sliding properties of the sliding elements to the given requirements.

A mixture of two types of PTFE is known for example from the documents WO 2011/075351 A1 or US 2001/0016625 A1. The subject matter of the former document is a fluoropolymer mixture with low molecular weight PTFE, high molecular weight PTFE, and at least two fluoropolymers which can be worked by melting, as a nonstick coating. The second document is concerned with providing a PTFE composition which can be worked, and particularly extruded, by melting.

In one advantageous embodiment of the sliding material according to the invention, the at least two different types of PTFE include high molecular weight (HMW) PTFE with an average molecular weight of $>10^6$ g/mol, and low molecular weight (LMW) PTFE with an average molecular weight $<10^6$ g/mol, preferably $<10^5$ g/mol.

The low molecular weight PTFE fraction can be, for example, one of the commercially available micropowder types. These PTFE micropowders can be produced by irradiation or thermal degradation of high molecular types, and generally have particle sizes on the order of magnitude of several μm. The molecular weight of micropowder types is on the order of $10^4$-$10^5$ g/mol.

The high molecular weight fraction of PTFE can, for example, consist of an extrusion grade with suitable grain size, preferably <300 μm. The "extrusion grades" are used to classify the PTFE according to its particle size and/or particle shape. For the high molecular weight PTFE, a pre-sintered powder, such as recycled material, is particularly preferred. The high-molecular grades have molecular weights on the order of magnitude of $10^6$-$10^7$ g/mol.

The melt viscosity for the micropowder grades is between $10^1$-$10^4$ Pa·s, and for the higher molecular weight grades is between $10^8$-$10^{10}$ Pa·s.

In a further advantageous embodiment, the PTFE additive of the sliding material contains up to 60 to 95% by volume, and in particular 65 to 87.5% by volume, of high molecular weight PTFE.

This composition achieves significant optimums for wear reduction without lubrication, and for the coefficient of friction with lubrication, of the sliding material. Therefore, the sliding material has the lowest friction coefficient and the greatest wear resistance.

The PTFE additive accordingly contains 5 to 40% by volume of the sliding material, and preferably 12.5 to 35% by volume of low molecular weight PTFE.

The total amount of the PTFE additive in a preferred embodiment of the sliding material is between 5 and 50% by volume, more preferably between 15 and 45% by volume, and most preferably not more than 35% by volume, in particular between 15 and 35% by volume, of the sliding material.

The total amount of PTFE with respect to the sliding material can only be varied within certain limits. At very low levels, especially below 5% by volume, the friction- and wear-reducing effect is reduced too much, such that there is no longer an advantage from the PTFE. Excessive amounts of PTFE, in particular more than 50% by volume, however, weaken the bond of the matrix material and feed to excessive wear and greatly reduced load capacity of the sliding layer. Accordingly, the preferred embodiment is an optimum between load capacity and sliding properties of the sliding material. A particularly preferred mixture comprises a total of between 15 and 45% by volume of PTFE, wherein for applications with higher loads, a limit of 35% by volume is even advantageous.

In a further advantageous embodiment, the thermoplastic matrix material of the sliding material comprises at least one material selected from the group consisting of PA (polyimide), PVDF (polyvinylidene fluoride), PFA (paraformaldehyde), ETFE (ethylene tetrafluoroethylene), PPA (polyphthalamide), PSU (polysulfone), PEI (polyetherimide), PEEK (polyetheretherketone), PPS (polyphenylene sulfide), PESU (polyether sulfone) or LCP (liquid crystal polymers).

The sliding layer can be easily adapted to different profiles of requirements placed on the sliding layer, by means of the different thermoplastic matrix materials. Furthermore, a great deal of experience exists in handling these materials, such that a light, fast and reliable processing is possible.

The glide layer preferably comprises further additives in the form of high-temperature thermopiastics such as PBA (polybenzimidazole), PI (polyimide), PAI (poiyamide-imide), PPTA (poly-p-phenylene terephthalamide), PPA (polyphthalamide) and/or PPSO$_2$ (polyphenylenesulfone), either individually or as a blend.

The sliding layer, on the other hand, preferably does not have fluoropolymers which can be worked by melting.

The wear resistance of the sliding material can be further increased by the addition of at least one high-temperature thermoplastic.

Preferably, the thermoplastic matrix material of the sliding material is formed by a material selected from the group PEEK, PPS, PPA and PESU, in combination with at least one of the anti-wear additives PPTA or PPSO$_2$.

It has been found that the wear resistance of the thermoplastic matrix material can be optimized with this combination of materials.

In order to further optimize the property profile of the sliding material, the same comprises additional components such as solid lubricants, fibrous materials and/or hard materials.

Hard materials, for example, can cause a smoothing of the opposing element, As a result, its abrasiveness is reduced, such that the long-term stability of the sliding material is increased as a result. Solid lubricants and fibrous materials likewise bring about changes in the wear resistance and the sliding properties of the sliding material, such that the addition of these substances enables matching the sliding material to requirements.

Preferably, the additional fraction of the high-temperature thermoplastics, solid lubricants, fibrous materials and/or hard materials together is a maximum of 30% of the sliding material.

Higher levels of these materials reduce the sliding ability of the sliding material, such that the wear and friction are too high. Furthermore, the matrix stability is reduced if the proportion of additional components is too high.

In one advantageous embodiment, the sliding material contains at least one solid lubricant selected from the group $MoS_2$, $WS_2$, hBN (hexagonal boron nitride), Pb, PbO, ZnS, $BaSO_4$, $CaF_2$ and graphite.

This embodiment has the advantage of a reduction of the frictional resistance, in particular for dry running.

Preferably, the sliding material comprises fibrous materials made of pitch- or PAN-based carbon fibers, polyaramide fibers, and/or glass fibers.

With the additional use of fibrous materials, the mechanical properties of the sliding material, and in particular the tensile strength and shear strength of the sliding material can be improved.

Preferably, the fibrous material consists of short fibers having a fiber length of less than 1.5 mm and in particular less than 0.5 mm.

A fibrous material of short fibers can be more easily distributed homogeneously within the thermoplastic matrix during the manufacture of the sliding material than, for example, long fibers. This also enables a homogeneous property distribution throughout the sliding material.

In a further advantageous embodiment of the sliding material, the hard materials are formed from at least one of the materials selected from the group SiC, $Si_3N_4$, BC, cBN (cubic boron nitride), phyllosilicates, metal oxides and $Fe_2O_3$.

Hard materials offer, for example, the possibility of conditioning the opposing element, particularly in the initial break-in period. This smooths potential irregularities in the sliding surface of the opposing element, thereby minimizing subsequent wear and reducing the friction occurring between the sliding surfaces.

Advantageously, the high molecular weight PTFE has to a particle size of <300 μm.

During the production of the sliding material, use of the high molecular weight PTFEs having grain sizes of less than 300 μm results in a sufficiently fine and uniform distribution of the PTFE within the thermoplastic matrix. As such, it is possible to enable a uniform property distribution throughout the sliding material as a whole.

In addition to the sliding material, the invention also comprises a sliding element with a metallic support layer, with a metallic, porous carrier layer applied to the support layer, and with a sliding material applied to the porous carrier layer or impregnated into the porous carrier layer, of the type described above.

However, the sliding material according to the invention should not be restricted to such composites. Rather, it also comprises, by way of example, solid plastics or metal-plastic composites of other types, such as laminates manufactured by gluing. In addition, the sliding material according to the invention can also be used in extrusion processes.

The invention further comprises a plain bearing, in particular a sleeve, a bearing shell, or thrust washer, in each case formed of such a sliding element.

THE DRAWINGS

Figure 2:
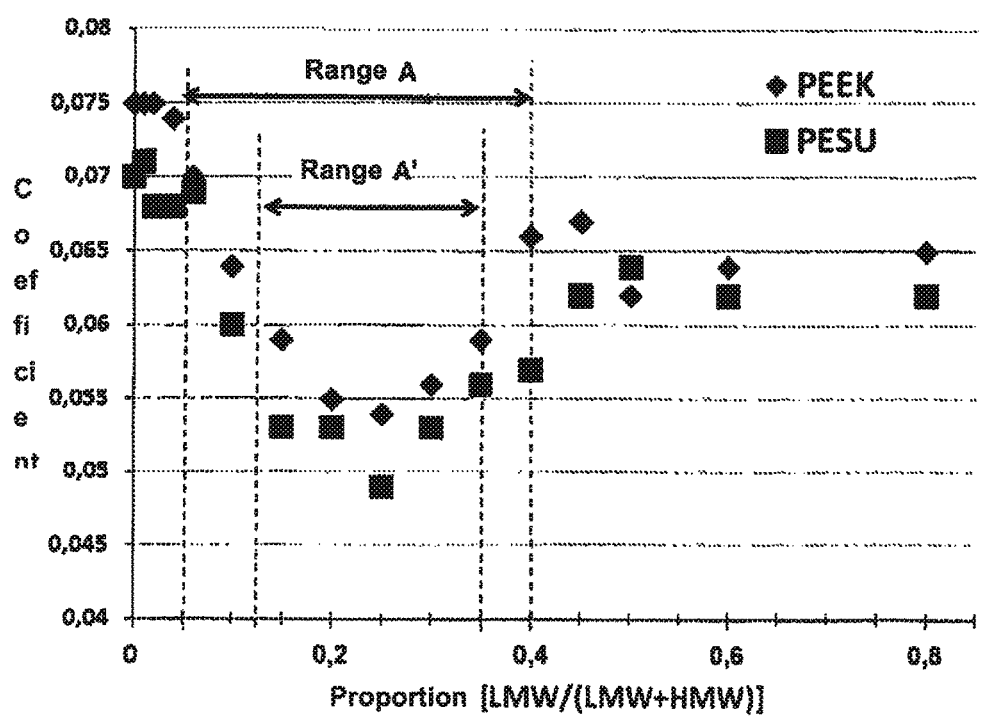

Further and exemplary embodiments, and other features of the sliding material, the sliding element, and of the radial plain bearing are further illustrated by the following figures, wherein:

FIG. 1 shows the wear behavior of various inventive sliding material compositions, FIG. 2 shows the coefficient of friction of various inventive sliding material compositions; and FIG. 3 is a fragmentary cross-sectional view of a representative sliding element having a support layer, a porous metallic carrier layer and a sliding material.

DETAILED DESCRIPTION

FIGS. 1 and 2 show two graphs, each with two series of measurements carried out on compositions according to the invention, with 30% by volume PTFE and PEEK and/or PESU as the matrix material. The composition of the PTFE varies in each case in such a manner that the total volume of PTFE contains from 0 to 80% by volume low molecular weight PTFE, and the remainder is high molecular weight PTFE.

The following explains the preparation of sliding materials for a sliding element 10 such as that represented in FIG. 3 according to the invention by way of example, the comparative samples for a comparative pin/roller test, and the execution of the tests.

The representative sliding element 10 of FIG. 3 has a metallic support layer 12 onto which is applied a metallic porous carrier layer 14. A sliding material 16 is applied to impregnate, cover, or both, the porous carrier layer 14.

The substances are mixed for 30 seconds at 18,000 rpm in a blender with pulse blades—for example in a 1,000-mL laboratory blender—to create the compositions of the invention; by way of example, 70 g PEEK, 15 g HMW PTFE, 7.5 g LMW PTFE, and 7.5 g PPTA. This mixture is then raked in the form of a 1 mm-thick layer of powder onto, by way of example, a steel strip with a 300 μm-thick sintered bronze coating having a pore volume of about 30%, and heated for 5 min at 380° C. After a short cooling of the surface in air, the sample is rolled in such a manner that the still-plastic layer is compressed and pressed into the pores.

For the pin/roller test, a round test blank with a diameter of 10 mm is punched out of the completely cooled sample band. The thickness of the test blank is measured and the test blank is pressed with a defined load of, for example, 20 MPa, onto a dry, degreased steel cylinder rotating at 100 rpm, with a diameter of 100 mm. The roughness of the steel cylinder at the test blank contact surface (shell surface of the steel cylinder) is initially approximately Rz=1 μm. After completion of the test, the thickness is measured again and the rate of wear is calculated from the difference of thicknesses before and after. The friction coefficients are determined via a torque sensor in the steel cylinder drive.

For a lubricated test, the test track is additionally continuously wetted by wick with hydraulic shock absorber oil.

The diagram in FIG. 1 presents the wear in μm of two different sliding materials according to the invention (30% by volume PTFE in the matrix material PEEK, and 30% by volume PTFE in the matrix material PESU, wherein in each case the composition of the PTFE is varied so that the total volume of PTFE contains from 0 to 80% by volume of low molecular weight PTFE, and the rest is high molecular weight PTFE), as a function of the ratio of the proportion of low molecular weight PTFE to the total volume of the PTFE. This data was obtained in the pin/roller test described above, at a load of 20 MPa and a relative speed of 0.5 m/s without lubrication.

It can be seen that the wear is the greatest without low molecular weight PTFE (corresponding to 100% by volume high molecular weight PTFE; at the coordinate origin of the x-axis). As the proportion increases, and therefore the fraction of low molecular weight PTFE increases, the wear is reduced in the range A according to the invention (5 to 40% by volume of low molecular weight PTFE), such that it is significantly below the PTFE types used alone (as only high molecular weight or low molecular weight PTFE). In the preferred range A' (12.5 to 35% by volume of low molecular weight PTFE), the wear values are positioned at a further significantly lower level. The wear increases as the proportion of low molecular weight PTFE continues to increase, until it reaches a plateau starting at about 45% by volume. This result applies for both the PEEK and the PESU matrix.

The diagram in FIG. 2 presents the coefficient of friction of the same sliding materials according to the invention (30% by volume PTFE in the matrix material PEEK, and 30% by volume PTFE in the matrix material PESU, wherein in each case the composition of the PTFE is varied so that the total volume of PTFE contains between 0 and 80% by volume of low molecular weight PTFE) in FIG. 1, as a function of the ratio of the low molecular weight PTFE to the total volume of the PTFE, determined in the pin/roller test described above at 20 MPa and 0.5 m/s, with lubrication.

Here it can be seen that the coefficient of friction is also the greatest without low molecular weight PTFE (at the origin of the x-axis). As the proportion increases, and therefore the fraction of low molecular weight PTFE increases, the coefficient of friction is also reduced, such that in the range A according to the invention (5 to 40% by volume of low molecular weight PTFE) it is significantly below the PTFE types used alone (as only high molecular weight or low molecular weight PTFE). In the preferred range A' (12.5 to 35% by volume of low molecular weight PTFE), the coefficients of friction are positioned at a further significantly lower level. As the proportion of low molecular weight PTFE increases further, the coefficient of friction increases until it reaches a plateau starting at about 45% by volume.

The following table provides a summary of sliding material compositions according to the invention, by way of example:

| # | | Matrix | High-temp. Plastic | Solid Lubricant | Hard material | Fibers | LMW PTFE | HMW PTFE | Friction Coeff. Lubricated | Wear Dry [μm] |
|---|---|---|---|---|---|---|---|---|---|---|
| | | | | | | % by volume | | | | |
| 1 | prior art | PEEK | | | | | | 20 | 0.081 | 52 |
| 2 | prior art | PEEK | | | | | 20 | | 0.085 | 59 |
| 3 | invention | PEEK | | | | | 5 | 15 | 0.063 | 40 |
| 4 | prior art | PEEK | | 7 Graphite | | 7 C-fiber | 7 | | 0.100 | 52 |

| # | | Matrix | High-temp. Plastic | Solid Lubricant | Hard material | Fibers | LMW PTFE | HMW PTFE | Friction Coeff. Lubricated | Wear Dry [μm] |
|---|---|---|---|---|---|---|---|---|---|---|
| | | | | | | % by volume | | | | |
| 5 | prior art | PEEK | | 7 Graphite | | 7 C-fiber | | 7 | 0.110 | 63 |
| 6 | invention | PEEK | | 7 Graphite | | 7 C-fiber | 2 | 5 | 0.084 | 31 |
| 7 | prior art | PVDF | | | | | 20 | | 0.058 | 55 |
| 8 | prior art | PVDF | | | | | | 20 | 0.066 | 57 |
| 9 | invention | PVDF | | | | | 5 | 15 | 0.049 | 37 |
| 10 | prior art | PPS | 5 PPTA | | | | 24 | | 0.049 | 41 |
| 11 | prior art | PPS | 5 PPTA | | | | | 24 | 0.054 | 35 |
| 12 | invention | PPS | 5 PPTA | | | | 6 | 18 | 0.044 | 24 |
| 13 | prior art | PPS | | | 1 Fe$_2$O$_3$ | | 28 | | 0.047 | 42 |
| 14 | prior art | PPS | | | 1 Fe$_2$O$_3$ | | | 28 | 0.054 | 39 |
| 15 | invention | PPS | | | 1 Fe$_2$O$_3$ | | 7 | 21 | 0.044 | 27 |
| 16 | prior art | PESU | 8 PPSO$_2$ | | | | 22 | | 0.053 | 34 |
| 17 | prior art | PESU | 8 PPSO$_2$ | | | | | 22 | 0.048 | 40 |
| 18 | invention | PESU | 8 PPSO$_2$ | | | | 5.5 | 16.5 | 0.042 | 24 |
| 19 | prior art | PESU | | 5 WS$_2$ | | 5 C-fiber | 20 | | 0.074 | 52 |
| 20 | prior art | PESU | | 5 WS$_2$ | | 5 C-fiber | | 20 | 0.079 | 52 |
| 21 | invention | PESU | | 5 WS$_2$ | | 5 C-fiber | 5 | 15 | 0.066 | 31 |
| 22 | prior art | PESU | | 5 h-BN | 2 SiC | | 20 | | 0.072 | 64 |
| 23 | prior art | PESU | | 5 h-BN | 2 SiC | | | 20 | 0.068 | 51 |
| 24 | invention | PESU | | 5 h-BN | 2 SiC | | 5 | 15 | 0.066 | 42 |
| 25 | prior art | PESU | 11 PAI | | | 4 C-fiber | 20 | | 0.070 | 32 |
| 26 | prior art | PESU | 11 PAI | | | 4 C-fiber | | 20 | 0.069 | 36 |
| 27 | invention | PESU | 11 PAI | | | 4 C-fiber | 5 | 15 | 0.052 | 21 |

The table shows different embodiments of the invention of the sliding material which have been tested by means of the pin/roller test at 20 MPa and 0.5 m/s, with and without lubrication. Two comparative tests are shown for each example according to the invention listed in the table. In each of these, compositions outside of the invention were tested with only one of the two types of PTFE. Compositions were tested with a variety of matrix materials, such as PEEK, PVDF, PPS or PESU, various solid lubricants or hard materials, and fibers. The proportions of LMW and HMW PTFE of the composition according to the invention varied in this case between 2:5; 5:15; 5.5:16.5: and up to 6:18 and then 7:21% by volume.

All sliding materials constituted according to the invention demonstrate lower wear without lubrication, and at the same time a lower coefficient of friction with lubrication, than sliding materials with the same PTFE content of one type, and an otherwise identical composition, independently of the matrix material or the additional solid lubricants, hard materials or fibers.

The invention claimed is:

1. A sliding element having a metallic support layer, having a metallic porous carrier layer applied to the support layer, and having a sliding material applied to the porous carrier layer or impregnated into the porous carrier layer, which has a thermoplastic matrix material and a PTFE additive, wherein the PTFE additive has at least two different types of PTFE with different molecular weights.

2. The sliding element according to claim 1, wherein the at least two different types of PTFE include high molecular weight PTFE having an average molecular weight of >$10^6$ g/mol and low molecular weight PTFE having a molecular weight of <$10^6$ g/mol.

3. The sliding element according to claim 2, wherein the PTFE additive contains 60 to 95% by volume of high molecular weight PTFE.

4. The sliding element according to claim 2, wherein the high molecular weight PTFE has a particle size of <300 μm.

5. The sliding element according to claim 2, wherein the PTFE additive contains 65-87.5% by volume of high molecular weight PTFE.

6. The sliding element according to claim 2, wherein the PTFE additive contains 12.5 to 35% by volume of low molecular weight PTFE.

7. The sliding element according to claim 2 wherein the PTFE additive contains 5 to 40% by volume of low molecular weight PTFE.

8. The sliding element according to claim 1, characterized in that the total amount of the PTFE additive is 5 to 50% by volume of the sliding material.

9. The sliding element according to claim 1, wherein the thermoplastic matrix material is formed of at least one material selected from the group consisting of PA, PVDF, PFA, ETFE, PPA, LCP, PSU, PEI, PEEK, PPS, and PESU.

10. The sliding element according to claim 1, wherein the thermoplastic matrix material has at least one anti-wear additive selected from the group PBA, PI, PAI, PBI, PPTA and PPSO2.

11. The sliding element according to claim 1, wherein the thermoplastic matrix material is formed by a material selected from the group consisting of PEEK, PPS, PPA and PESU, in combination with at least one anti-wear additive consisting of PPTA or PPSO2.

12. The sliding element according to claim 1, including an additional fraction of at least one of the components: solid lubricants, fibrous materials and hard materials.

13. The sliding element according to claim 12, wherein the additional fraction of anti-wear additives, along with the solid lubricants, fibrous materials and hard materials together, makes up no more than 30% by volume of the sliding material.

14. The sliding element according to claim 12 wherein the solid lubricants contain at least one of the materials selected from the group consisting of MoS2, WS2, hBN, Pb, PbO, ZnS, BaSO4, CaF2 and graphite.

15. The sliding element according to claim 12 wherein the hard materials are at least one of the materials selected from the group consisting of SiC, Si3N4, BC, cBN, phyllosilicates, metal oxides and Fe2O3.

16. A plain bearing comprising one of a sleeve, bearing shell, or thrust washer, formed of at least one sliding element according to claim 1.

17. The sliding element according to claim 1, wherein the low molecular weight PTFE has a molecular weight $<10^5$ g/mol.

18. The sliding element according to claim 1, wherein the total amount of the PTFE additive is 15 to 45% by volume of the sliding material.

* * * * *

UNITED STATES PATENT AND TRADEMARK OFFICE
CERTIFICATE OF CORRECTION

PATENT NO. : 9,970,483 B2
APPLICATION NO. : 15/107972
DATED : May 15, 2018
INVENTOR(S) : Adam Achim and Norbert Fleischhacker Page 1 of 1

It is certified that error appears in the above-identified patent and that said Letters Patent is hereby corrected as shown below:

In the Specification

Column 1, Line 40: "theft" should read --their--

Column 1, Line 44: "theft" should read --their--

Column 3, Line 19: "feed" should read --lead--

Signed and Sealed this
Fourth Day of June, 2019

Andrei Iancu
*Director of the United States Patent and Trademark Office*